United States Patent
Fan et al.

(10) Patent No.: US 8,925,447 B2
(45) Date of Patent: Jan. 6, 2015

(54) COOKING BELT

(75) Inventors: Hua Fan, Nashua, NH (US); Anne B. Hardy, Paris (FR); Timothy P. Pollock, Manchester, NH (US); Ephraim P. Lin, Bedford, NH (US)

(73) Assignee: Saint-Gobain Performance Plastics Corporation, Aurora, OH (US)

(*) Notice: Subject to any disclaimer, the term of this patent is extended or adjusted under 35 U.S.C. 154(b) by 531 days.

(21) Appl. No.: 13/158,182

(22) Filed: Jun. 10, 2011

(65) Prior Publication Data
US 2011/0303101 A1    Dec. 15, 2011

Related U.S. Application Data

(60) Provisional application No. 61/354,104, filed on Jun. 11, 2010.

(51) Int. Cl.
*A21B 1/48*     (2006.01)
*A47J 37/04*   (2006.01)

(52) U.S. Cl.
CPC ............................ *A47J 37/045* (2013.01)
USPC ........................................................ 99/443 C

(58) Field of Classification Search
CPC .................................................. A47J 37/045
USPC .............. 99/422, 443 C, 386, 387, 391, 393;
442/97, 98, 172, 180, 286, 289, 261;
524/544; 526/242; 523/101; 264/435;
428/421, 422
See application file for complete search history.

(56) References Cited

U.S. PATENT DOCUMENTS

| 5,141,800 A | 8/1992 | Effenberger et al. |
| 5,466,531 A | 11/1995 | Tippett et al. |
| 7,153,792 B2 * | 12/2006 | Sahlin et al. ................. 442/246 |
| 2005/0121437 A1 | 6/2005 | Spohn et al. |
| 2006/0204748 A1 * | 9/2006 | Lee et al. ..................... 428/339 |
| 2007/0190336 A1 | 8/2007 | Patel et al. |
| 2010/0044382 A1 | 2/2010 | Woerner |

FOREIGN PATENT DOCUMENTS

| EP | 0 407 982 A2 | | 1/1991 |
| JP | 10-034742 | * | 2/1998 |
| JP | 2008081318 A | | 4/2008 |
| WO | 2010021708 A2 | | 2/2010 |
| WO | WO 2010/045149 | * | 4/2010 |

OTHER PUBLICATIONS

International Search Report from PCT/US2011/040052 mailed Feb. 21, 2012, 1 pg.

* cited by examiner

*Primary Examiner* — Dana Ross
*Assistant Examiner* — Joseph Iskra
(74) *Attorney, Agent, or Firm* — Abel Law Group, LLP; Chi Suk Kim

(57) ABSTRACT

A grilling belt includes a flexible support having first and second major surfaces, an extruded fluoropolymer layer overlying the first major surface, and a cast or skived fluoropolymer layer overlying the extruded fluoropolymer layer. Another grilling belt can include a support having first and second major surfaces, and a first fluoropolymer film overlying the first major surface. The support can include a first fabric having a first bias angle, and a second fabric laminated to the first fabric and having a second bias angle different from the first bias angle by between 20° and 160°.

20 Claims, 3 Drawing Sheets

COOKING BELT

CORRESPONDING APPLICATION

The present application claims priority from U.S. Provisional Patent Application No. 61/354,104, filed Jun. 11, 2010, entitled "COOKING BELT," naming inventor Hua Fan, Anne B. Hardy, Timothy P. Pollock, and Ephraim P. Lin, which application is incorporated by reference herein in its entirety.

FIELD OF THE DISCLOSURE

This disclosure, in general, relates to a cooking belt.

BACKGROUND

In the food industry, particularly in relation to commercially prepackaged and prepared foods or restaurants, businesses are turning to faster methods of cooking food in a uniform manner. In addition, such businesses are seeking to streamline operations including cleanup operations and are seeking to reduce the risk of employee injury.

In an example, commercially prepackaged food products or commercially precooked foods can be cooked on a cooking belt. In another example, meat can be cooked on a flat surface (i.e., standard stove configuration) with heat only from below. Non-stick cooking surfaces can prevent sticking of the food product to the cooking surface. Reduced sticking results in reduced effort used to remove the cooked food product from the surface. The reduced sticking also reduces burnt residue that is to be scraped off the cooking surface so that subsequent food products to be cooked do not stick. However, continued use and wear of the non-stick surface can diminish the non-stick properties. As such, further improvements to non-stick cooking surfaces are desired.

SUMMARY

In an embodiment, a grilling belt can include a flexible support having first and second major surfaces, an extruded fluoropolymer layer overlying the first major surface, and a second fluoropolymer layer overlying the extruded fluoropolymer layer. The second fluoropolymer layer can be a cast fluoropolymer layer or skived fluoropolymer layer.

In another embodiment, a grilling belt can include a support having first and second major surfaces, and a first fluoropolymer film overlying the first major surface. The support can include a first fabric having a first bias angle, and a second fabric laminated to the first fabric and having a second bias angle different from the first bias angle by between 20° and 160°.

In a further embodiment, a grilling system can include first and second rollers, a heat source, and a grilling belt looped around the first and second rollers. The grilling belt can have first and second ends joined together. Further, the grilling belt can include a flexible support having first and second major surfaces, an extruded fluoropolymer layer overlying the first major surface, and a second fluoropolymer layer overlying the extruded fluoropolymer layer. The second fluoropolymer layer can be a cast fluoropolymer layer or skived fluoropolymer layer.

In yet another embodiment, a method of forming a grilling belt can include providing a first flexible support having first and second major surfaces and first and second ends, laminating a first fluoropolymer layer overlying the first major surface, and laminating a second fluoropolymer layer overlying the extruded fluoropolymer layer. The first fluoropolymer layer can include an extruded film.

In still another embodiment, a method of forming a grilling belt can include providing a flexible support having first and second major surfaces and first and second ends, extruding a first fluoropolymer film, casting a second fluoropolymer film overlying the first fluoropolymer film, and laminating the first fluoropolymer film to the first major surface of the flexible support.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Grilling or cooking belts are often used for the production of commercially precooked and prepackaged food. The cooking belts can be used in a continuous process for the preparation of the food, significantly increasing productivity over a static surface, such as a grill. However, the continuous movement of the belt can result in stresses to the components, leading to wear and eventually to replacing the belt. Cooking belts extend to lengths up to hundreds of feet and replacement of such belts can be complicated and time consuming, thus causing significant production delays.

Generally, the belts are replaced when the ability of the cooking surface to release the food product is reduced. The failure of the cooking surface is often the result of the formation of splits in the surface. The splits can expose underlying components of the cooking belt, such as a reinforcement material that may not have the same release properties as the overlying non-stick surface. Additionally, the splits can trap liquids or greases, and provide a path for the liquid or grease to reach the fibers of the reinforcement material. Once liquid or grease has penetrated the reinforcement material, residues from the liquid or grease can abrade the reinforcement material during further use, reducing the mechanical properties of the belt, leading to potential breakage of the belt.

Applicants discovered that in particular instances splits, which tend to extend along either fill or warp direction, depending on the style of greige good, can form on the points of overlap of the fill and warp yarns. The splits can form due to the shearing stress, such as from the movement of the belt around rollers. If allowed to propagate, such splits can permit grease and other liquids to infuse into fibrous supports, leading to embrittled belts with reduced strength and stress resistance.

In a particular embodiment, a sheet material includes a low surface energy polymer, such as a fluoropolymer. Such a sheet material can be in the form of a grill sheet, a cooking belt, a film, a coating, or a combination thereof. In an embodiment, a sheet material particularly suitable as a cooking belt includes a reinforcement material and a fluoropolymer film overlying the reinforcement material. In an example, the fluoropolymer film is an extruded fluoropolymer film, such as an expanded fluoropolymer film. Optionally, a skived or cast fluoropolymer film can be placed to overlie the extruded fluoropolymer film. Such an embodiment can prevent split propagation, leading to improved mechanical properties and belt life.

Figure 1:
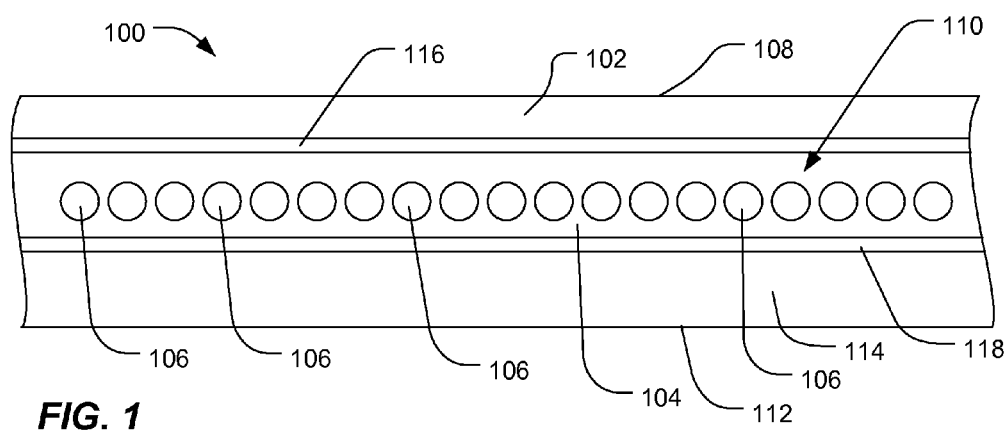
FIG. 1 includes an illustration of a cross-section of an exemplary sheet material.

In the embodiment illustrated in FIG. 1, a sheet material 100, such as a cooking sheet, includes a reinforcement material 110 and a fluoropolymer layer 104 overlying the reinforcement material 110 on one or both sides of the reinforcement material 110. A upper layer 102 can be disposed on or can overlie the fluoropolymer layer 104, and, optionally, an bottom layer 114 can be disposed under or can underlie the fluoropolymer layer 104. As described herein, the terms "over" or "overlie" are used to describe locations relatively closer to a cooking surface or the surface intended to contact an item, such as food, to be heated. The terms "under" or "underlie" describe locations relatively further from the cooking surface.

As illustrated, the upper layer 102 forms a cooking surface 108. Absent the upper layer 102, the fluoropolymer layer 104 can form the cooking surface 108. In addition, the bottom layer 114 forms a contact surface 112 to contact a support or rollers. Absent the bottom layer 114, the fluoropolymer layer 104 can form the contact surface 112.

Optionally, an intermediate layer 116 can be disposed between the fluoropolymer layer 104 and the upper layer 102, and an intermediate layer 118 can be disposed between the fluoropolymer layer 104 and the bottom layer 114. In a particular embodiment, the sheet material 100 can be free of an intermediate layer 118 and bottom layer 114, and is in the form of a single sided laminate.

In an example, the sheet material 100 is a cooking belt, such as a closed-loop cooking belt. The cooking belt can have length (longest orthogonal dimension) of at least 1 m, such as at least 3 meters, at least 10 meters, or even at least 30 meters. In addition, the cooking belt can have an aspect ratio, defined as the ratio of the length to the width (second longest orthogonal dimension) of at least 10, such as at least 30 or even at least 100.

The reinforcement material 110 can include a fibrous reinforcement, such as a woven or nonwoven fibrous reinforcement. For example, the fibrous reinforcement can be a woven fabric or an intermeshing of randomly oriented fibrous strands. In one exemplary embodiment, the fabric is a woven glass fabric. In another exemplary embodiment, the fabric is a knitted fabric. In other embodiments, the reinforcement can include a mesh of ceramic, plastic, or metallic material or sheets of composite materials, among others. Alternatively, the reinforcement material 110 can take the form of a substrate, typically a sheet. Embodiments can use supports formed of high melting point thermoplastics, such as thermoplastic polyimides, polyether-ether ketones, polyaryl ketones, polyphenylene sulfide, and polyetherimides; thermosetting plastics, particularly of the high temperature capable thermosetting resins, such as polyimides; coated or laminated textiles based on the above thermoplastics or similar thermally stable resins and thermally stable reinforcements such as fiberglass, graphite, and polyaramid; plastic coated metal foil; and metallized or metal foil laminated plastic films. In addition, exemplary embodiments include woven and non-woven materials formed of fibers selected from aramid such as Kevlar® or Nomex®, fluorinated polymer, fiberglass, graphite, polyimide, polyphenylene sulfide, polyketones, polyesters, or a combination thereof. In particular, the fibrous reinforcement includes a fiberglass reinforcement that has been cleaned or pretreated with heat. Alternatively, the fibrous reinforcement can be a coated fiberglass reinforcement. In a particular example, each of the fibers of the fiberglass can be individually sized with a polymeric coating.

In an example, the reinforcement material 110 includes a fabric. The fabric includes a plurality of yarns 106. In an example, the yarns 106 are interwoven together to form the fabric. While the yarns 106 are illustrated in FIG. 1 to be uniformly distributed, the yarns 106 can be bunched together.

In a particular example, each filament of the yarn 106 can be pretreated prior to incorporation into the yarn 106 or into the fabric. For example, each filament can be coated with a size coat. In a particular example, the size coat includes a silane or other hydrophobic or oleophobic chemical that improves a bond with fluoropolymers, such as a perfluoropolymer.

The fabric can have a weight in a range of 0.7 osy to 15 osy, such as a weight of 1.0 osy to 12 osy, or even a weight of 1.5 osy to 10 osy. The fabric can have yarns in a range of 20 to 80 yarns per inch, such as 30 to 70 yarns per inch or even 40 to 65 yarns per inch in the warp or fill directions. Further, the fabric can have a thickness in a range between 1.0 mil and 15.0 mils, such as a range of 2.0 mils to 12.0 mils, or in particular, in a range of 3.0 mils to 10.0 mils.

Figure 2:
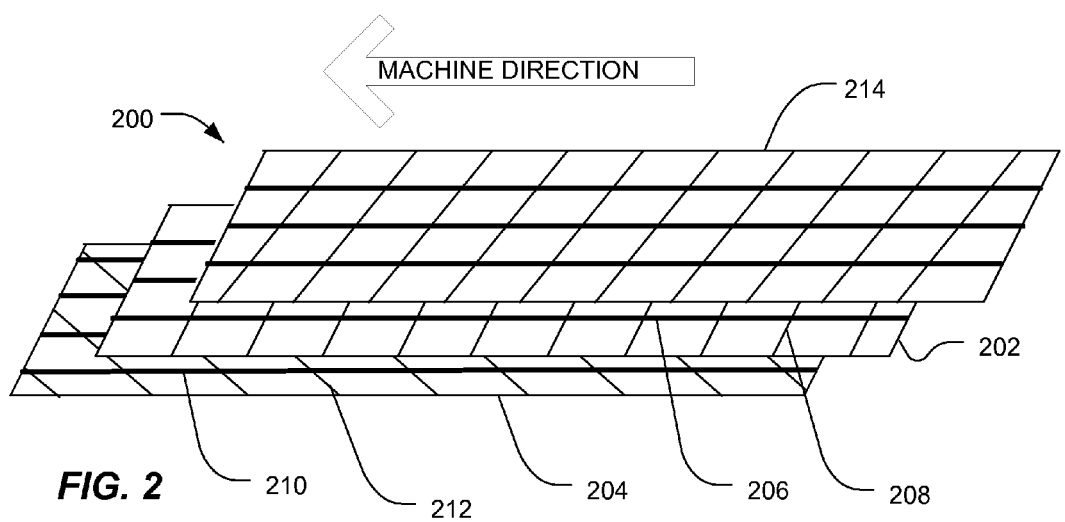
FIG. 2 includes an illustration of an exemplary reinforcement material.

In a particular embodiment, the reinforcement material can include a plurality of fabric layers. FIG. 2 provides an illustration of a reinforcement material 200 including one or more fabric layers, such as fabric layer 202, fabric layer 204, and fabric layer 214. A fabric layer 202 can include warp yarns 206 and fill yarns (weft yarns) 208. The warp yarns 206 can be oriented substantially parallel to the movement direction of the belt. The movement direction can be the direction in which the belt travels during operation and can be substantially parallel to the length of the belt. The fill yarns 208 can be oriented substantially perpendicular to the warp yarns 206 and substantially perpendicular to the movement direction.

Alternatively or in addition, the reinforcement material 200 can include one or more sheets of fabric including fill yarns that are askew from the perpendicular. For example, the fabric layer 204 can include warp yarn 210 and fill yarns 212. Fabric layer 204 can be biased such that the fill yarns 212 are not perpendicular to the warp yarns. For example, the fill yarns 212 can be oriented at an angle of about 10° to about 70° relative to the machine or warp direction as indicated by the warp yarns 210, such as at an angle of about 15° to about 45°. Fabric layer 204 can be left biased (the smallest angle formed between the warp and fill yarns) is on the left side relative to the warp direction) or right biased (the smallest angle is on the right side relative to the warp direction). In an example, the fabric layer 214 can include fill yarns that are askew. In particular, the fabric layer 214 can include fill yarns that askew in a manner opposite that of the fabric layer 204. For example, the fabric layer 204 can be left side biased and the fabric layer 214 can be right side biased or visa-versa.

In an example, more than one fabric layers having different fill yarn orientations can be coupled to form the reinforcement layer. For example, fabric layers 202 and 204 can be bonded together, such as by laminating, with or without an adhesive, or an autogenous bonding process. In an example, each fabric layer can be coated with a fluoropolymer coating. In particular, two or more layers can be bonded with intermediate fluoropolymer layers, such as intermediate coatings of fluoropolymer or a melt adhesive fluoropolymer. In another example, the layers can be pre-sized with a fluoropolymer and heat laminated together. In a further example, an adhesive, such as a silane adhesive, can be applied to bond the layers together. In an additional example, fiber layers, such as fiberglass layers, can be autogenously bonded in the presence of charged gas.

In a particular embodiment, the reinforcement material 200 can include additional fabric layers. The additional fabric layers can biased in an opposite direction from fabric layer 204. For example, fabric layer 204 can be left biased and an additional fabric layer can be right biased. In a particular example, the fabric layer 204 can have a bias angle, defined as the angle formed between the warp and fill yarns on the left side of the fabric relative to the warp direction, of less than 90°, such as in a range of 10° to 70°, and the fabric layer 214 can have a bias angle greater than 90°, such as in a range of 100° to 160°. For example, the fabric layer 204 can have a bias angle in a range of 15° to 60°, such as a range of 30° to 45°, and the fabric layer 214 can have a bias angle in a range of 105° to 150°, such as a range of 120° to 135°. The difference in bias angles between the two fabrics 204 and 214 can be in a range of 20° to 160°, such as a range of 40° to 140°, such as a range of 60° to 90°. In such an embodiment, the reinforcement material 200 can include a fabric layer 202 or can be free of fabric layer 202.

Returning to FIG. 1, the reinforcement material 110 is incorporated within the fluoropolymer layer 104. Alternatively, the fluoropolymer layer 104 can be disposed on either side of the reinforcement material 110. In particular, the fluoropolymer layer 104 can reside closer to the cooking surface 112.

In an embodiment, the fluoropolymer layer 104 includes a fluoropolymer. An exemplary fluoropolymer can be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary fluoropolymer includes polytetrafluoroethylene (PTFE), a fluorinated ethylene propylene copolymer (FEP), a copolymer of tetrafluoroethylene and perfluoropropyl vinyl ether (perfluoroalkoxy or PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. In an example, the fluoropolymer includes polytetrafluoroethylene (PTFE), fluorinated ethylene propylene (FEP), perfluoroalkoxy (PFA), polyvinylidene fluoride (PVDF), or any combination thereof. In particular, the fluoropolymer can include polytetrafluoroethylene (PTFE), fluorinated ethylene propylene (FEP), perfluoroalkoxy (PFA), or any combination thereof. In a further embodiment, the fluoropolymer can be a perfluoropolymer, such as PTFE or FEP.

In a particular example, the fluoropolymer includes a perfluoropolymer. For example, the perfluoropolymer can include polytetrafluoroethylene (PTFE), fluorinated ethylene propylene (FEP), perfluoroalkoxy (PFA), or any blend or copolymer thereof. In a particular example, the fluoropolymer layer 104 includes polytetrafluoroethylene (PTFE).

A upper layer 102 can be formed on top of or can overlie the fluoropolymer layer 104. In an example, the upper layer 102 includes a fluoropolymer, such as a perfluoropolymer. For example, the upper layer 102 can include PTFE. In another example, the upper layer 102 includes a thermoplastic processible fluoropolymer. For example, the upper layer 102 can include a perfluoroalkoxy (PFA), fluorinated ethylene propylene (FEP), or a blend or copolymer thereof.

In a further example, the upper layer 102 can include a blend of perfluoropolymer and a second polymer. In an example, the second polymer can include a silicone. The silicone polymer can include a polysiloxane. For example, the silicone polymer can include a polyalkylsiloxane, a phenylsilicone, a fluorosilicone, or any combination thereof. In an example, a polyalkysiloxane includes a polydimethylsiloxane, a polydipropylsiloxane, a polymethylpropylsiloxane, or any combination thereof. In particular, the silicone polymer can be derived from an aqueous dispersion of precured silicone polymers. In an example, the silicone polymer can be derived from an aqueous dispersion and can include precured silicone. In particular, the silicone polymer can be derived from an aqueous dispersion of precured silicone with terminal groups or additives, such as cross-linkers. For example, the silicone polymer can be selected from a silicone polymer dispersion available from Wacker-Chemie GmbH, Munchen, Germany, such as the Wacker CT27E silicone rubber dispersion, or available from Dow Corning, such as DC2-1266 silicone rubber. In particular, the silicone is formulated such that it can be used in contact with food or in medical applications, herein referred to as "at least food grade." Further, the sheet material can be at least food grade, being formed of materials that can be used in contact with food, such as permitted by the United States of America Food and Drug Administration.

The blend can include silicone polymer in an amount in a range of 0 wt % to 80 wt % based on the total weight of the solids of the blend, such as a range of 0 wt % to 40 wt %. For example, the blend can include silicone polymer in an amount in a range of 2 wt % to 30 wt %, such as a range of 5 wt % to 30 wt %, a range of 10 wt % to 30 wt %, or even a range of 15 wt % to 20 wt %. In addition, the blend can include fluoropolymer, such as perfluoropolymer, in an amount in a range of 60 wt % to 100 wt %, such as a range of 75 wt % to 90 wt %, or even a range of 80 wt % to 85 wt %.

The fluoropolymer layers can be formed of extruded fluoropolymer, cast fluoropolymer, or skived fluoropolymer. The extruded fluoropolymer can be paste extruded and can be stretched, such as uniaxially stretched or biaxially stretched. Stretched film that are stretched to a ratio of at least 3:1, such as a ratio of at least 4:1 are referred to herein as expanded. For example, the extruded fluoropolymer can be an expanded PTFE layer. The fluoropolymer layers can be formed directly on the reinforcement material 110 or can be formed as separate layers and laminated to the structure.

In a particular example, a fluoropolymer layer includes an extruded film and an upper layer includes a cast film or a skived film. The extruded film can be an expanded film, such as a biaxially expanded layer. For example, an extruded film can be laminated to a coated reinforcement material. A coating of fluoropolymer can be cast over the extruded fluoropolymer film to form the upper layer. Alternatively, a separate cast film can be laminated over the extruded fluoropolymer layer. In a particular example, each of the layers can be formed of a perfluoropolymer, such as PTFE.

Figure 3:
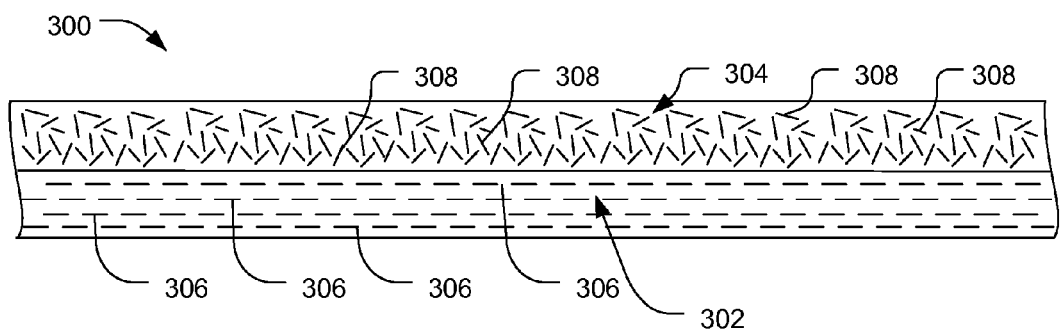
FIG. 3 includes an illustration of a cross-section of a portion of an exemplary sheet material.

For example, FIG. 3 shows a cross-section of a portion 300 of a sheet material, such as a cooking belt, which includes an extruded fluoropolymer film 302 and a cast or skived fluoropolymer film 304 overlying the extruded fluoropolymer film 302. The portion 300 can be laminated to a coated reinforcement material, such as a fluoropolymer coated fabric. The extruded fluoropolymer film 302 can be expanded or stretched in either a uniaxially or biaxially. The extruded fluoropolymer film 302 can exhibit a high degree of alignment of the fluoropolymer molecules 306 in a machined direction. When stretched biaxially, the fluoropolymer molecules 306 can be substantially aligned in two directions. The alignment of fluoropolymer molecules 306 can increase the strength of the film in the direction of alignment. However, the extruded fluoropolymer film 302, particularly if expanded, can have a high permeability and can be weak in a non-machined direction. Fluoropolymer molecules 308 in the cast or skived fluoropolymer film 304 can be randomly oriented. In a particular example, fluoropolymer film 304 can have a low permeability. The resulting material can exhibit a reduction in split formation and propagation, providing for extended belt life.

In a further embodiment, portion 300 can include additional layers. For example, the portion 300 can include extruded fluoropolymer films applied to align at an angle to the alignment direction of the other extruded fluoropolymer film 302. For example, the angle between the alignment directions of two extruded fluoropolymer films can be about 15° to about 75°, such as about 30° to about 60°.

In an example, the extruded fluoropolymer film 302 can have a thickness in a range of about 0.2 mils to about 3 mils. For example, the thickness of the fluoropolymer film 302 can be in a range of 0.5 mils to 2 mils.

Returning to FIG. 1, the bottom layer 114 can be formed under or can underlie the fluoropolymer layer 104. In an example, the bottom layer 114 includes a fluoropolymer, such as a perfluoropolymer, such as PTFE. In a particular example, the bottom layer 114 includes a thermoplastic processible fluoropolymer. For example, the bottom layer 114 can include a perfluoroalkoxy (PFA), fluorinated ethylene propylene (FEP), or a combination thereof.

In an example, the bottom layer 114 and upper layer 102 form symmetric layers on either side of the reinforcement layer 110. Alternatively, the bottom layer 114 and the upper layer 102 form asymmetric layers about the reinforcement layer 110. In a further example, the sheet material 100 can include one or the other, or both of the upper layer 102 and the bottom layer 114.

An intermediate layer 116 can be formed to overlie the fluoropolymer layer 104, and an intermediate layer 118 can be formed to underlie the fluoropolymer layer 104. In an example, the intermediate layers 116 or 118 can be formed of a fluoropolymer. The fluoropolymer can be different from the fluoropolymer of the fluoropolymer layer 104. In an example, the fluoropolymer of the intermediate layer 116 or 118 can be a meltable fluoropolymer.

While not illustrated, additional layers can be included between the fluoropolymer layer 104 and the reinforcement, over the upper layer 102, or under the bottom layer 114. For example, the reinforcement layer 110 can include yarns coated with a polymer, such as fluoropolymer. In another example, an additional coated layer can be disposed between the fluoropolymer layer 104 and the reinforcement or over the upper layer 102.

In a further alternative, the sheet material 100 can be free of layers and coatings that underlie the reinforcement material 110, for example, being free of bottom layer 114. In such an example, the sheet material 100 can be a single sided laminate, including layers only on one side of the reinforcement layer 110, except for sizing on the fabric. In particular, it has been discovered that embodiments of the single sided laminate exhibit desirable lamination strength with the reinforcement material 110.

The sheet material 100 can exhibit desirable features. In particular, the sheet material 100 has a thickness of at least 2.5 mils, such as at least 5 mils. For example, the sheet material 100 can have a thickness in a range of 5 mils to 20 mils, such as a range of 7.5 mils to 16 mils.

In addition, the sheet material 100 exhibits desirable mechanical properties. For example, the sheet material 100 can have a desirable tensile strength in both the warp and fill directions. In addition, the sheet material 100 can have a desirable trapezoidal tear strength. Moreover, the sheet material 100 can retain desirable mechanical properties after distress. For example, the sheet material 100 can exhibit a desirable crease tensile strength and crease trapezoidal tear strength. In addition, the sheet material 100 can exhibit a desirable MIT flex performance.

In a particular embodiment, tensile strength can be measured using ASTM D902. The sheet material 100 can have a tensile strength in the warp or machine direction (generally parallel to length) of at least 30 lbs, such as at least 50 lbs. In particular, especially in the context of a belt, the sheet material can have a tensile strength in the warp direction of at least 300 pounds per linear inch (PLI), such as at least 375 PLI, or event at least 450 PLI. In a further example, the tensile strength in the weft or fill direction (generally parallel to width) can be at least 45 lbs, such as at least 65 lbs, or even at least 80 lbs. In particular, especially in the context of a belt, the belt material can have a tensile strength in the fill direction can be at least 250 PLI, such as at least 275 PLI, or even at least 300 PLI.

The sheet material 100 can have a desirable trapezoidal tear strength as measured in accordance with ASTM D751, as modified by ASTM D4969. For example, the trapezoidal tear strength of the sheet material 100 in the warp direction can be at least 3.5 lbs, such as at least 4.0 lbs. Particularly in the context of a belt, the belt material can have a desirable trapezoidal tear strength in the warp direction of at least 25 lbs, such as at least 40 lbs, at least 60 lbs, or even at least 80 lbs. In another example, the sheet material 100 can have a trapezoidal tear strength in the fill direction of at least 15 lbs, such as at least 25 lbs, at least 40 lbs, or even at least 60 lbs.

In addition, the sheet material 100 can exhibit desirable tensile strength and trapezoidal tear strength after distress, such as creasing. In particular, the tensile strength and trapezoidal tear strength can be measured after creasing one time with a 10 lb roller applied parallel to a fold. The tensile strength of the material after creasing with the 10 lb roller is denoted as the crease tensile strength, and the trapezoidal tear strength after creasing is denoted the crease trapezoidal tear strength. In particular, the sheet material 100 can have a crease tensile strength in the warp direction of at least 10 lbs, such as at least 15 lbs, or even at least 17 lbs. Further, the sheet material 100 can exhibit a crease trapezoidal tear strength of at least 0.5 lbs, such as at least 1.0 lbs.

The durability of the sheet material 100 under distress can also be characterized by the MIT flex performance. For example, the sheet material 100 can have a MIT flex performance of at least 10,000, such as at least 15,000, at least 20,000, or even at least 25,000. The MIT flex performance is measured with repetitions at 2 pounds on a ½ inch wide specimen in accordance with the folding endurance test of ASTM D2176-63J.

In a further example, the sheet material 100 exhibits low permeability. In particular, the sheet material 100 is not porous or layers that can be porous, such as an extruded fluoropolymer film or a layer comprising the perfluoropolymer/silicone blend, include pores that are not substantially interconnected or are localized to that layer. For example, the sheet material 100 can have a permeability of not greater than 0.001 cu. in/min, as measured in accordance with ASTM D737, such as having a permeability of approximately 0 cu, in/min within the sensitivity of the measuring device. As such, the sheet material 100 can be impermeable. In a particular example, a sheet material 100 including a reinforcement layer and a layer comprising the fluoropolymer has a permeability of not greater than 0.001 cu. in/min.

Further, the sheet material 100 performs well when tested for cooking performance. In particular, the sheet material 100 is resistant to wicking of grease and charring of grease. In an example, wicking is tested by subjecting the sheet to hot grease for greater than 16 hours, typically 1 week, at 400° F. When grease wicks into the fabric or cooking sheet, it tends to char and weaken the fabric. In addition, it tends to discolor both the fabric and the individual filaments. Embodiments of the sheet material 100 described above exhibit little or no wicking, little or no charring of grease, and little or no discoloration of the filaments or the fabric. Thus, embodiments of the sheet material 100 receive a pass rating for the wicking rating.

Figure 4:
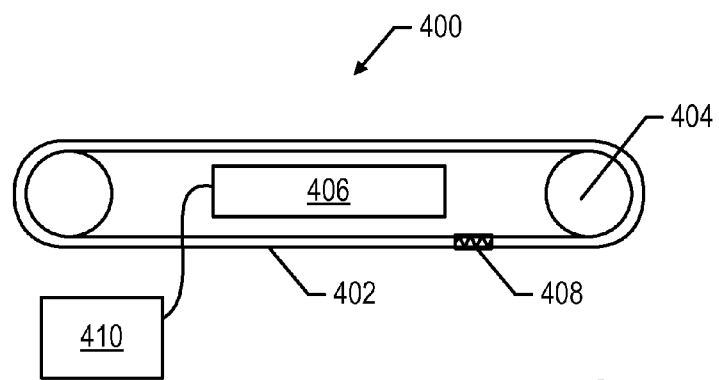
FIGS. 4 and 5 include illustrations of exemplary cooking belt systems.

In a further embodiment, the sheet material forms a cooking belt. As illustrated in FIG. 4, a system 400 includes a belt 402 and a heat source 406. The belt 402 includes a flexible support, such as a reinforcement material with a fluoropolymer layer overlying the reinforcement material. The outer surface of the cooking belt can include a cast or skived fluoropolymer film overlying an expanded fluoropolymer film. A control unit 410 can be used to influence the amount of heat that is provided by the heat source 406. In a particular example, the belt material 100 has a thickness of not greater than 20 mils, such as not greater than 14 mils, or even not greater than 8 mils.

As shown in the particular embodiment, the belt 402 forms a closed loop belt. The closed loop belt is wrapped around rollers 404. Typically, the belt 402 is flexible to allow routing around the rollers 404 and continual rotational movement around the rollers 404. The flexible support can constitute a portion of the belt 402 or substantially the entirety of the belt 402. The belt 402 can include other portions, such as a lacing or clasp mechanism 408. In an alternative embodiment, the ends of the belt can be joined together without a lacing or clasp mechanism, such as by melt fusing.

In addition, the belt 402 exhibits desirable mechanical properties, as described above. For example, the belt 402 can have a desirable tensile strength in both the warp and fill directions. In addition, the belt 402 can have a desirable trapezoidal tear strength. Moreover, the belt 402 can retain desirable mechanical properties after distress. For example, the belt 402 can exhibit a desirable crease tensile strength and crease trapezoidal tear strength. In addition, the belt 402 can exhibit a desirable MIT flex performance.

Figure 5:
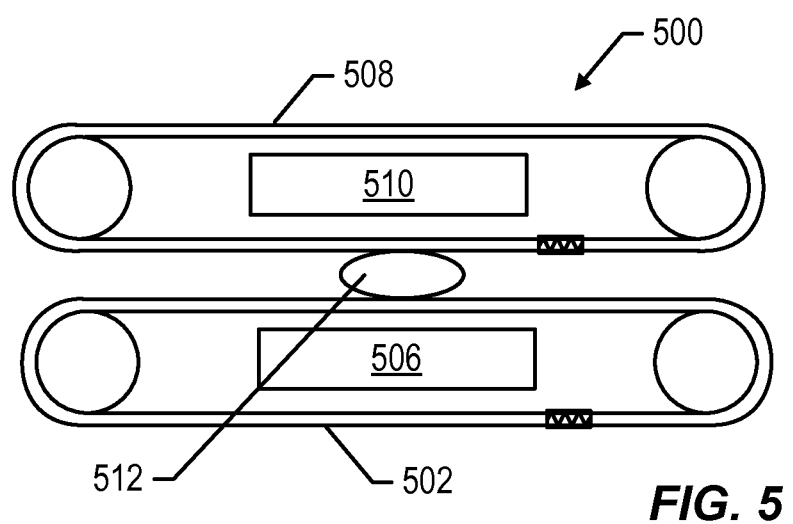

In a further example, the sheet material can be used in a two belt system, such as the system 500 illustrated in FIG. 5. For example, the sheet material can used to form a belt 502 or a belt 508. The outer surfaces of at least the belt 502 and optionally, the belt 508 can include a cast or skived fluoropolymer film overlying an expanded fluoropolymer film. Each belt (502 or 508) can be heated by respective heat sources (506 or 510). In a particular example, a food product 512 can be placed between the belts (502 or 508) and cooked. In general, the belts (502 or 508) travel at the same speed to avoid shear in the food product 512. Depending on the nature and positioning of the heat sources (506 or 510), the food product 512 can be cooked on both sides simultaneously.

The sheet material can be formed by applying layers directly to the dispensed fabric or by laminating film to the fabric, or by combinations thereof. For example, an expanded PTFE film can be laminated to a side of the fabric. A film formed by skiving or by casting can be applied over the expanded PTFE film and laminated to the expanded PTFE film. Alternatively, a layer can be cast or dip coated directly to the expanded PTFE film, either after applying the expanded PTFE film to the fabric or prior to applying the expanded PTFE film to the fabric.

In particular, the method can include dispensing a reinforcement material, such as a fabric and applying an expanded PTFE film over one side of the reinforcement material. A cast PTFE film or a skived PTFE film can be laminated over the expanded PTFE film. Optionally, the process is performed on a single side of the reinforcement material. Alternatively, the process can be repeated or performed simultaneously for a second side of the reinforcement material.

In another embodiment, the sheet material can be formed by a method that includes dispensing a fabric. In an example, the fabric is a fiberglass fabric that includes filaments that are individually size coated. The fabric can be dip coated into a dispersion including a fluoropolymer, such as a perfluoropolymer. Excess dispersion can be metered from the fabric and the fluoropolymer dispersion can be heated to drive off solvents and surfactants and to consolidate the fluoropolymer. The coating process can be performed one or more times, such as at least two times, at least three times, or even at least four times. A fluoropolymer film can be laminated to the coated fabric or a layer can be extruded or cast onto one or more surfaces of the coated fabric.

In a particular example, the sheet material is formed through a process of coating a carrier web or a reinforcement material (e.g., the fabric) with a low surface energy, low coefficient of friction material, such as fluoropolymer. The carrier web or the reinforcement material are paid from a roll and coated on at least one side with a suspension including fluorinated polymer particles dispersed in a liquid medium. In one particular embodiment, the suspension includes a fluoropolymer aqueous dispersion to which surfactant has been added. Alternatively, the suspension can be free of surfactant.

A blade or metering rod is positioned to remove excess suspension from the carrier web. The suspension is then dried and sintered to form a layer on the carrier web. In a particular embodiment, the coated suspension is dried at a temperature in a range of about 150° F. to about 300° F. and sintered at a temperature in a range of about 550° F. to about 720° F. Optionally, surfactants can be driven off the coating prior to sintering by heating at a temperature in a range of about 500° F. to about 600° F. The thickness of the layer can be increased by repeating the coating process. In one exemplary embodiment, the carrier web can be coated with the suspension, the suspension dried, and a second coating applied to the dried suspension before sintering.

In exemplary embodiments, the thickness of the fluorinated polymer coating is generally about 0.2-12 mils. For example, the thickness can be about 0.2-4 mils, such as about 0.5-3 mils. The second layer can have a thickness of about 0.1 mils to about 5 mils, such as about 0.1 mils to 3 mils, or even about 0.1 mils to 1 mil.

A second layer of fluoropolymer can be applied over the first layer. For example, the second layer can include a second fluoropolymer. Alternatively, the second layer can be applied by extruding a layer over the first layer. In another example, a second layer can be laminated to first layer, such as through heat lamination.

A third layer of fluoropolymer can be applied over the second layer. For example, the third layer can include a third fluoropolymer. The third layer can be applied by extruding or casting over the second layer. In an example, the third layer can be extruded or cast over the second layer prior to laminating the second layer to the first layer. In another example, a third layer can be laminated to second layer, such as through heat lamination. For example, the third layer can be a skived layer that is laminated to the second layer. The third layer can be laminated to the second layer either prior to, after, or substantially at the same time as laminating the second layer to the first layer.

In a further embodiment, a cooking film can be formed using the above described method by replacing the reinforcement layer with a carrier or an extruded film. The coated film is formed on the carrier or the extruded film. In the case of coating on a carrier, the coated film is subsequently separated from the carrier to provide a free form coated film. The free form coated film can be laminated to a reinforcement material or an extruded film. In an example, the free form coated film can be laminated to an extruded film and the combination laminated to a reinforcement material. In another example, an extruded film coated with a coated film can be laminated to the reinforcement material. In a further example, an extruded film and a free form coated film can be laminated to a reinforcement material separately. A cooking belt can be formed using the above described method followed by coupling ends of the sheet material to form a closed loop belt in which the outer surface of the belt has nucleation structures. In another embodiment, the cooking sheet can be applied as a cover on a conveyor belt or a liner of a cooking container. In an additional example, cooking surface with nucleation structures can be applied by spray coating the layer.

In particular, the sheet material, the cooking film, or the conveyor belt is formed of materials and structures suitable for use in cooking applications, and are not formed of materials that are not accepted for at least cooking applications by the United States Food of America and Drug Administration. In an example, the conveyor belt or film can be used in commercial cooking services. For example, the conveyor belt or film can be used in meat cooking processes, such as to cook bacon, chicken, mixed meat products, or any combination thereof. In another example, a film can be placed into a vessel used to boil water. In general, the sheet material, cooking sheet, or film can be used to form a non-stick cooking surface with low splatter characteristics.

Particular embodiments of the sheet material exhibit desirable technical advantages. For example, the sheet material exhibits a resistance to split formation and propagation. In particular, the cooking belts have an extended durability and resistance to tear. Further, the coated belts can be resistant to creasing, wicking of grease, and charring. As described below, testing has shown durability under strenuous conditions with desirable cooking performance. As such, the cooking belts provide a durable film that maintains food quality.

EXAMPLES

Testing Methods

CREASE TEST: The crease tensile strength and crease trapezoidal tear strength can be measured after creasing a sample one time with a 10 lb roller applied parallel to a fold. The tensile strength of the material after creasing with the 10 lb roller is denoted as the crease tensile strength and is measured in accordance with ASTM D902, and the trapezoidal tear strength after creasing is denoted the crease trapezoidal tear strength and is measured in accordance with ASTM D751, as modified by ASTM D4969.

Example 1

Comparative Sample 1 is a Silver 12 (commercially available from Saint Gobain Corporation).

Comparative Sample 2 is a Silver 10 (commercially available from Saint Gobain Corporation).

Comparative Sample 3 is a Ultra 3310 (commercially available from Saint Gobain Corporation).

Comparative Sample 4 is a FG214 (commercially available from Saint Gobain Corporation).

Sample 1 is prepared by applying a 1-pass coating of PTFE to a 1080 glass fabric. Additionally, a 2-pass coating of PTFE is applied to a 2116 glass fabric. The glass fabrics are laminated together and an additional 2-pass coating of PTFE is applied. A 1.2 mil fluoropolymer film is laminated to one side of the glass fabrics.

Sample 2 is prepared by applying a 1-pass coating of PTFE to a 1080 glass fabric. Additionally, a 2-pass coating of PTFE is applied to a 7628 glass fabric having a fluoropolymer sizing applied to the yarns. The glass fabrics are laminated together and an additional 2-pass coating of PTFE is applied. A 1.2 mil fluoropolymer film is laminated to one side of the glass fabrics.

Sample 3 is prepared by applying a 1-pass coating of PTFE to a 1080 glass fabric. Additionally, a 2-pass coating of PTFE is applied to a 128 glass fabric. The glass fabrics are laminated together and an additional 2-pass coating of PTFE is applied. A 1.2 mil fluoropolymer film is laminated to one side of the glass fabrics.

Sample 4 is prepared by applying a 2-pass coating of PTFE to a 1080 glass fabric having a fluoropolymer sizing applied to the yarns. Additionally, a 4-pass coating of PTFE is applied to a 7628 glass fabric having a fluoropolymer sizing. The glass fabrics are laminated together. A 1.2 mil fluoropolymer film is laminated to one side of the glass fabrics.

Sample 5 is prepared by applying five passes of a PTFE coating to a 7628 glass fabric having a fluoropolymer sizing applied to the yarns. The PTFE coating is biased to one side of the glass fabric. A 1.2 mil fluoropolymer film is laminated to the thinner side of the coated glass fabric.

Sample 6 is prepared as Sample 5, except 7 passes of the PTFE coating are applied.

Sample 7 is prepared as Sample 5, except the fluoropolymer film has a thickness of 0.9 mil.

Sample 8 is prepared by applying seven passes of a PTFE coating to a 128 glass fabric. The PTFE coating is biased to one side of the glass fabric. A 1.2 mil fluoropolymer film is laminated to the thinner side of the coated glass fabric.

Sample 9 is prepared as Sample 8, except eight passes of the PTFE coating are applied.

Samples 10 and 11 are prepared by applying seven passes of a PTFE coating to a 128 glass fabric. The PTFE coating is biased to one side of the glass fabric. A 1.2 mil cast fluoropolymer film and a 0.3 mil extruded fluoropolymer film are laminated the thinner side of the coated glass fabric.

Sample 12 is prepared by applying seven passes of a PTFE coating to a 141 glass fabric. The PTFE coating is biased to one side of the glass fabric. A 1.2 mil fluoropolymer film is laminated to the thinner side of the coated glass fabric.

Tables 1A and 1B illustrate the performance of the samples.

TABLE 1A

Performance of Samples

|  | CS 1 | CS 2 | CS 3 | CS 4 | 1 | 2 | 3 | 4 |
|---|---|---|---|---|---|---|---|---|
| Thickness (mils) | 11.8 | 9.7 | 14.7 | 14.2 | 8.1 | 11.5 | 12.2 | 11.7 |
| Weight (osy) | 17.9 | 14.1 | 20.3 | 21.3 | 12.5 | 15.8 | 17.3 | 17.3 |

TABLE 1A-continued

Performance of Samples

|  | CS 1 | CS 2 | CS 3 | CS 4 | 1 | 2 | 3 | 4 |
|---|---|---|---|---|---|---|---|---|
| Coat Adh, lbs | 6.5 | — | — | 11.9 | 7.9 | 7.4 | 8.3 | 4.6 |
| Trap Tear, lbs W | 15.0 | 17.6 | 27.4 | 17.4 | 13.2 | 46.1 | 31.7 | 25.7 |
| Trap Tear, lbs F. | 12.8 | 13.8 | 18.4 | 14.1 | 11.3 | 35.0 | 25.0 | 15.3 |
| Tensile Str, lbs W | 358 | 321 | 485 | 424 | 315 | 450 | 481 | 489 |
| Tensile Str, lbs F. | 247 | 207 | 329 | 295 | 259 | 294 | 338 | 289 |

TABLE 1B

Performance of Samples

|  | 5 | 6 | 7 | 8 | 9 | 10 | 11 | 12 |
|---|---|---|---|---|---|---|---|---|
| Thickness (mils) | 9.9 | 9.9 | 9.4 | 10.9 | 12.0 | 11.7 | 10.8 | 15.3 |
| Weight (osy) | 14.6 | 14.9 | 13.8 | 16.4 | 18.0 | 17.6 | 15.0 | 21.9 |
| Coat Adh, lbs | 2.9 | 2.1 | 2.1 | 6.5 | 6.4 | 6.8 | 6.3 | 14.3 |
| Trap Tear, lbs W | 31.5 | 35.4 | 34.2 | 20.5 | 18.4 | 18.7 | 14.9 | 29.0 |
| Trap Tear, lbs F. | 24.9 | 28.9 | 24.3 | 15.9 | 15.0 | 17.6 | 10.4 | 19.8 |
| Tensile Str, lbs W | 423 | 420 | 439 | 382 | 381 | 391 | 303 | 529 |
| Tensile Str, lbs F. | 277 | 273 | 312 | 257 | 257 | 249 | 184 | 308 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A grilling belt comprising:
    a flexible support have first and second major surfaces;
    an extruded fluoropolymer layer overlying the first major surface; and
    a cast or skived fluoropolymer layer overlying the extruded fluoropolymer layer, wherein the cast or skived fluoropolymer layer comprises fluoropolymer molecules that are randomly oriented.

2. The grilling belt of claim 1, wherein the extruded fluoropolymer layer includes a first fluoropolymer film having a molecular alignment direction substantially parallel to the length of the grilling belt.

3. The grilling belt of claim 1, wherein the flexible support includes a first woven fabric.

4. The grilling belt of claim 3, wherein the first woven fabric has a weight in a range of about 0.7 osy to about 15 osy.

5. The grilling belt of claim 3, wherein the first woven fabric includes glass filaments with a fluoropolymer sizing.

6. The grilling belt of claim 3, wherein the flexible support includes a second woven fabric attached to the first woven fabric.

7. The grilling belt of claim 6, wherein the first fabric has a first bias angle and the second fabric has a second bias angle, and the difference between the first and second bias angles is between 20° and 160°.

8. The grilling belt of claim 1, further comprising a second extruded fluoropolymer layer overlying the second major surface of the flexible support.

9. The grilling belt of claim 1, wherein the fluoropolymer is polytetrafluoroethylene (PTFE), hexafluoropropylene (HFP), fluorinated ethylene propylene (FEP), perfluoroalkyl vinyl ether (PFA), or a combination thereof.

10. The grilling belt of claim 1, wherein the grilling belt has a tensile strength in the warp direction of at least about 300 PLI.

11. The grilling belt of claim 1, wherein the grilling belt has a tensile strength in the fill direction of at least about 250 PLI.

12. A grilling belt comprising:
    a support having first and second major surfaces, the support comprising:
        a first fabric having a first bias angle formed between warp and fill yarns of the first fabric,
        a second fabric laminated to the first fabric and having a second bias angle formed between warp and fill yarns of the second fabric, wherein the first and second fabrics form the first and second major surface of the support, the first bias angle is a right side bias, the second bias angle is a left side bias, and the second bias angle is different from the first bias angle by between 20° and 160°, and
        a third fabric disposed between the first and second fabric and having warp and fill yarns that are substantially perpendicular to each other; and
    a first fluoropolymer film overlying the first major surface.

13. The grilling belt of claim 12, wherein the first woven fabric includes glass fibers with a fluoropolymer sizing.

14. The grilling belt of claim 12, wherein the fluoropolymer of the first fluoropolymer layer is polytetrafluoroethylene (PTFE), hexafluoropropylene (HFP), fluorinated ethylene propylene (FEP), perfluoroalkyl vinyl ether (PFA), or a combination thereof.

15. The grilling belt of claim 12, wherein the grilling belt has a tensile strength in the warp direction of at least about 300 PLI.

16. The grilling belt of claim 12, wherein the grilling belt has a tensile strength in the fill direction of at least about 250 PLI.

17. The grilling belt of claim 12, wherein the grilling belt has a trap tear strength in the warp direction of at least about 40 lbs.

18. The grilling belt of claim 12, wherein the grilling belt has a trap tear strength in the fill direction of at least about 25 lbs.

19. A grilling system comprising:
first and second rollers;
a heat source; and
a grilling belt looped around the first and second rollers, the grilling belt having first and second ends joined together, the grilling belt including:
   a flexible support have first and second major surfaces;
   an extruded fluoropolymer layer overlying the first major surface; and
   a cast fluoropolymer layer overlying the extruded fluoropolymer layer, wherein the cast or skived fluoropolymer layer comprises fluoropolymer molecules that are randomly oriented.

20. The grilling belt of claim 1, wherein the extruded fluoropolymer layer is in direct contact with the flexible support.

* * * * *